Dec. 24, 1929.  A. WALTNER  1,740,632
ANIMAL TRAP
Filed May 14, 1928  2 Sheets-Sheet 1

INVENTOR
Albert Waltner
BY Frederick W. Baker
ATTORNEY

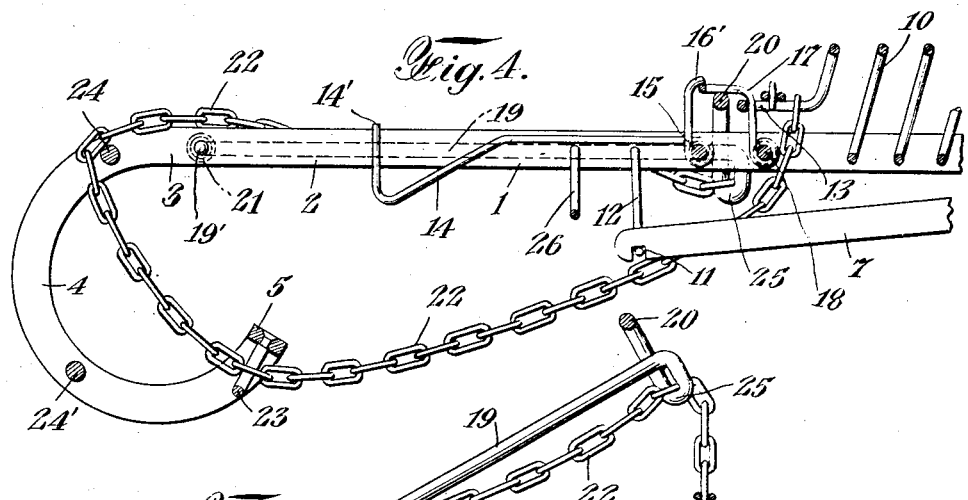
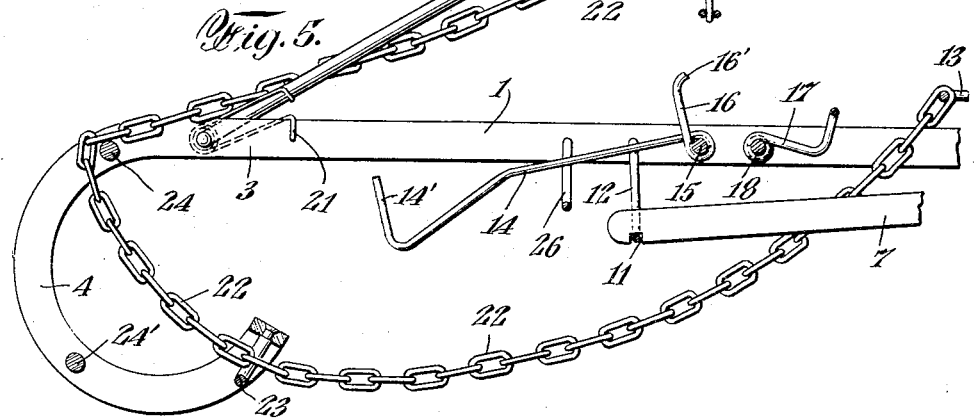
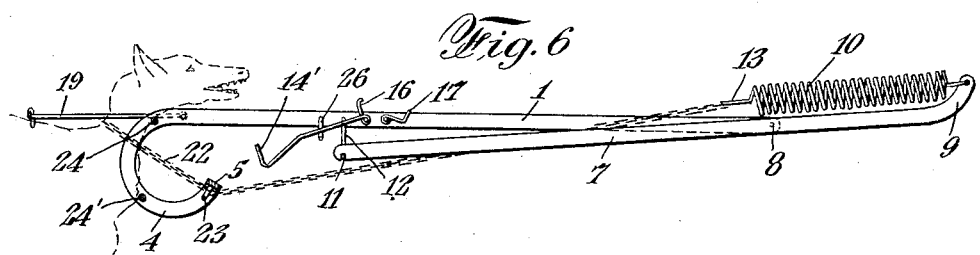
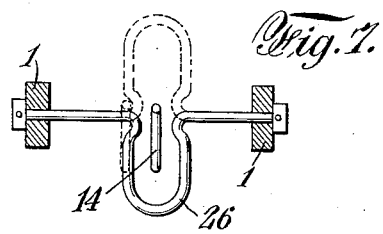

Patented Dec. 24, 1929

1,740,632

UNITED STATES PATENT OFFICE

ALBERT WALTNER, OF BROOKLYN, NEW YORK

ANIMAL TRAP

Application filed May 14, 1928. Serial No. 277,498.

This invention relates to improvements in traps for the humane catching and instant killing of fur bearing animals, thereby avoiding the torture that results from merely maiming, as well as preventing injury to the fur.

Therefore, my invention consists in the novel construction of a trap having a chain that is adapted to be thrown by spring action over the neck of an animal attacking the bait; and in the provision of a powerful spring, which is released at the same time and serves to exert a sharp tug upon the chain with such force as to break the animal's neck. Fixed means upon the trap opposed to the animal's throat co-act with the chain in this operation.

Also the invention includes means whereby it can be locked when set, rendering it safe in transportation, release of the locking means being easily effected when the trap has been positioned for service.

Other features and advantages of my invention will hereinafter appear.

In the drawings:

Fig. 4 is a similar view in side sectional elevation.

Fig. 5 is a view corresponding to that of Fig. 4, excepting that the chain is partly thrown.

Fig. 6 is a side elevation of the trap as operated, and

Fig. 7 is a detail of the locking device.

Figure 1:
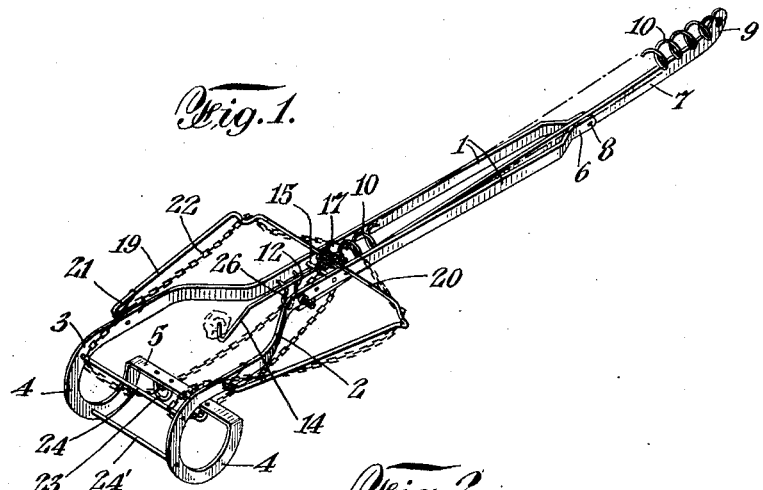
Figure 1 is a perspective view of my improved trap, showing it baited, set and locked.
Figure 2:
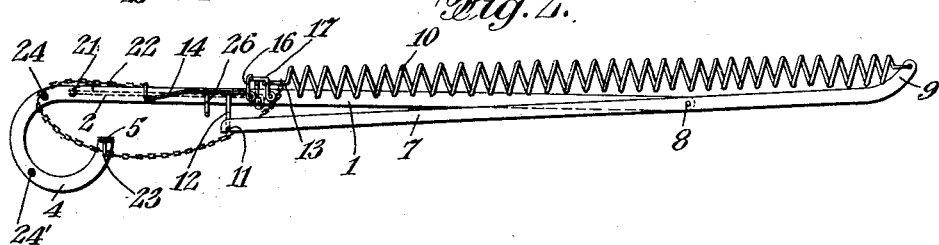
Fig. 2 is a side sectional view thereof, with the lock released.
Figure 3:
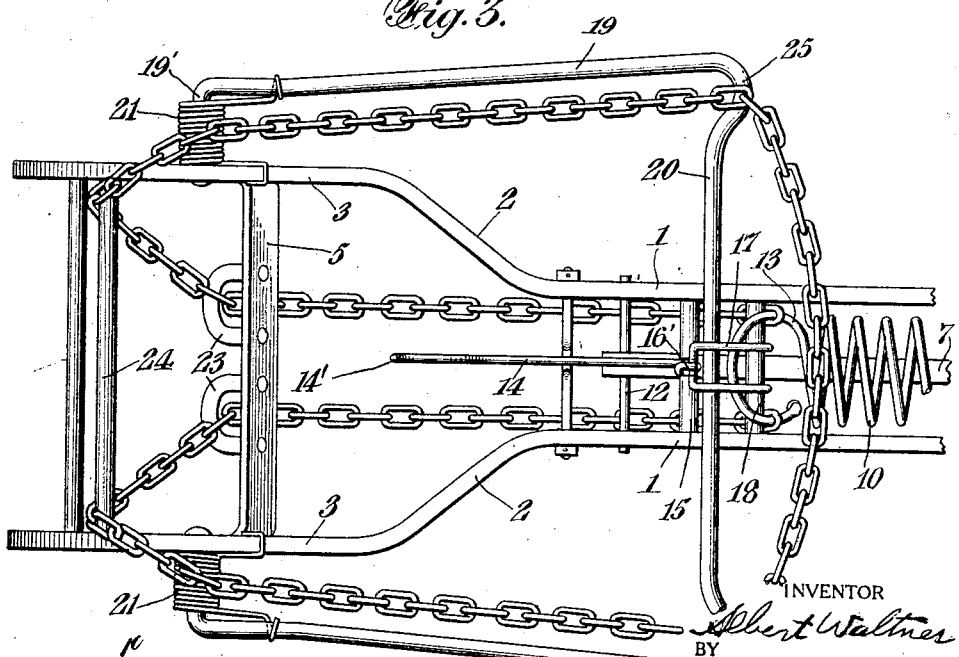
Fig. 3 is an enlarged, partial plan view showing the spring actuated chain throwing means in its set, lock released position.

The frame of my improved tray is composed of the parallel side bars 1, 1, having spaced relation, and at one end diverging into the yoke-like arms 2, 2, that continue into the parallel portions 3, 3 which are rearwardly and upwardly curved at 4, 4, and are provided at their ends with a connecting, transverse bar 5. Said side bars 1, 1, at their other ends 6, 6 are bent toward each other and embrace a centrally disposed bar or lever 7, which is in pivotal engagement therewith, the pivot being in the form of a stud or bolt 8 that connects said ends 6, 6. The lever 7 has a curved end 9, with which is engaged one end of a helical spring 10, while the other end of said lever is provided with a notch 11, adapted for engagement with a bail 12 that is pivotally held by the bars 1, 1. The other end of spring 10 is provided with a hook or loop 13 that is adapted to engage certain trap springing devices, under the control of the bait holder, all of which will be described hereinafter, but in order to effect such engagement, which is done while the spring is released, lever 7 is swung about its pivot to thus carry said spring forwardly, whereafter, with the spring engaging the trap springing devices the lever can be reversed to extend the spring, the lever then being engaged by its notch 11 with bail 12. The spring is thereby held in its extended, operative position.

The bait holder consists of a member 14 pivoted to a bar 15 that extends transversely between the frame bars 1, said member having a forward portion that terminates in an upturned hook 14' to carry the bait, and said member having an upward portion 16 with a rearwardly directed hook 16'. An angled eye element 17, pivoted to a bar 18 that extends transversely between the frame bars 1, 1, rearwardly of bar 15, is adapted for engagement by hook 16' in the trap set position, the tension of spring 10, which engages the eye element 17 in advance of its pivot, having the effect of exerting upward pressure to force the eye element into frictional contact with the hook 16', thus creating a latch engagement that holds spring 10 extended.

A pivotal frame in the form of a yoke is adapted to throw a chain over the neck of an animal taking the bait from the trap, said yoke has the side arms 19, 19 which have angled ends 19', 19' pivoted to the portions 3, 3 respectively of the trap frame, and said arms being connected by a transverse bar 20. Helical springs 21 are placed around the ends 19', 19', respectively engaging the frame portions 3, 3 and said arms 19, 19, exert their tension to throw said yoke from a rearward to a forward position, in advance of the trap, in order that the bar 20 may strike the back of an animal taking the bait. In setting the trap the yoke is swung rearwardly against the tension of its springs 21, and its cross-bar 20 is engaged beneath the eye member 17 before said eye member is caught by the hook 16' of the bait holding member.

The chain which is to be thrown by the yoke over the neck of an animal taking the bait is indicated by the reference numeral 22 and is shown as having its ends engaged by the loop 13 of spring 10, the chain ends being passed through eyelets 23, 23, secured to and projected downwardly from frame bar 5, for that purpose. The remainder of the chain is passed around a bar 24 that is extended between the curved frame ends 4, 4 and is carried over the transverse yoke bar 20, lying loosely thereover in depressions 25, 25 formed in said bar, to thus constitute a free chain loop.

With the trap baited, and set in the manner indicated, it is to be positioned in such manner, known to trappers, that the approach to the bait is toward the front end of the trap, so that the animal's head will pass over bar 24 in seizing the bait. As the bait is attacked this act will rock the member 14, thereby releasing hook 16' from eye member 17 thereby permitting the recoil of spring 10, said spring, in its retraction, carrying with it the chain 22. At the same time the yoke bar 20 is released from its confinement by eye member 17, the yoke is thrown forwardly by its springs 21, carrying with it the looped portion of the chain, said looped portion falling upon the neck of the animal taking the bait, and as the animal's throat will at that time be opposed to bar 24, and a lower bar 24' carried by the frame ends 4, 4 the pull upon the chain in the retractile effort of spring 10 will cause the chain loop to break the animal's neck, causing instant death.

Located in the downward path of the bait carrying member 14 is a U-shaped support 26 therefor, said support having the projecting portions 26', 26' that have pivotal engagement with the frame bars 1, 1. When the trap is unset and the member 14 resting upon support 26, the bait, indicated at 27, may be conveniently impaled upon hook 14'.

When the trap has been set in the manner previously described, and is to be carried to a suitable location for service, the "setting" may be locked to avoid the liability of being sprung accidently, for which purpose the U-shaped support is to be turned upwardly, in the manner shown in dotted lines, in Fig. 7, and the bait carrying member 14 is lodged in a recess 26 provided at either side of said member 26 to receive said member 14.

As set and locked the trap may be safely transported, and the lock can be quickly released by reversing the position of member 26 and then shifting the bait carrying member into a position between the legs of the U forming part of said member 26, where it is free to have downward movement such as is imparted thereto in the seizure of the bait.

Variations within the spirit and scope of my invention are equally comprehended by the foregoing disclosure.

I claim:

1. The combination in an animal trap having a frame, of a bait holding member, fixed means to engage the throat of an animal attacking the bait, a looped chain, means for throwing said chain vertically over and upon the neck of said animal to co-act with said fixed means for breaking said animal's neck, a spring to actuate said chain and means for setting said bait member, said setting means controlling said spring and chain throwing means.

2. The combination in an animal trap having a frame of a bait holding member, fixed means to engage the throat of an animal attacking the bait, a looped chain, means for throwing said chain vertically over and upon the neck of said animal to co-act with said fixed means for breaking said animal's neck, a spring to actuate said chain, means for setting said bait member, said setting means controlling said spring and chain throwing means, and means for releasably locking said bait member in its set position.

3. The combination in an animal trap of a pivotal bait carrying member, means for engaging said bait member to releasably hold it in a set position, a spring, means for storing energy therein, said spring being held extended by said bait member holding means, a chain engaging said spring, tensional means for throwing said chain to engage the neck of an animal taking the bait, and means whereby an attack upon the bait serves to release said carrying member, thereby also causing the release of said spring and chain throwing means.

4. The combination in an animal trap of a pivotal bait carrying member, means for engaging said bait member to releasably hold it in set position, releasable locking means for said bait member as set, a spring, means for storing energy therein, said spring being held extended by said bait member holding means, a chain engaging said spring, tensional means for throwing said chain to engage the neck of an animal taking the bait, and means whereby an attack upon the bait serves to release said carrying member, thereby also causing the release of said spring and chain throwing means.

5. The combination in an animal trap having a frame, of a pivotal bait carrying member, a spring actuated chain throwing member, a chain adapted to be thrown thereby over the neck of an animal taking the bait, spring means adapted to exert a sharp pull upon said chain, pivotal means for holding said bait member in set position, and releasing said bait member when the bait is attacked, said pivotal means also releasably engaging said spring and chain throwing member, and said chain throwing member and spring becoming operative when the bait member is released from its pivotal holding means.

6. The combination in an animal trap having a frame, of a pivotal bait carrying member, means for releasably locking said bait member in its set position, a spring actuated chain throwing member, a chain adapted to be thrown thereby over the neck of an animal taking the bait, spring means adapted to exert a sharp pull upon said chain, pivotal means for holding said bait member in set position, and releasing said bait member when the bait is attacked, said pivotal means also releasably engaging said spring and chain throwing member, and said chain throwing member and spring becoming operative when the bait member is released from its pivotal holding means.

New York, N. Y., May 11th, 1928.

ALBERT WALTNER.